G. B. Fairman.
Chuck.

N° 88,377. Patented Mar. 30, 1869.

WITNESSES:
W. Lorenzo Gage
George A. Gage

INVENTOR:
Geo. B. Fairman.

GEORGE B. FAIRMAN, OF ROCHESTER, NEW YORK, ASSIGNOR TO JOHN TELFORD, OF SAME PLACE.

Letters Patent No. 88,377, dated March 30, 1869.

IMPROVED CHUCK.

The Schedule referred to in these Letters Patent and making part of the same.

*To all whom it may concern:*

Be it known that I, GEORGE B. FAIRMAN, of the city of Rochester, in the State of New York, have invented a new and useful Improved Chuck; and I do hereby declare that the following is a full, clear, and exact description thereof, reference being had to the accompanying drawing, making part of this specification, in which—

The nature of this invention will be understood from the drawings and specifications.

To enable others skilled in the art to make and use my invention, I will describe its construction and operation.

I make a chuck, C, in the usual form of this class, with the exception, that instead of having annular rack A, in a recess on the inside of the disks B B', forming the chuck C, I place it in a recess, $f$, on the outside of the disk B', so that it can be got at to throw it in and out of gear with the pinions D, on the shaft E, that operate the jaws F.

The rack A is made sufficiently thick to have formed in its inside edge two grooves, $e$ and $c$, to receive the buttons G for the purposes of holding it firmly, the one, $e$, in gear, and the other, $c$, out of gear.

On the disk B', and inside of the recess $f$, I fasten the buttons G by a screw, $h$, which may be loosened to turn them in and out of the grooves in the rack.

I also form projections H, on the outside of the rack, which have holes $a$, to receive a bar to turn it, when it is desirable to throw the jaws of the chuck in and out more rapidly than can be done in the ordinary way by a wrench applied to the projecting pinion-shafts E.

Figure 1:
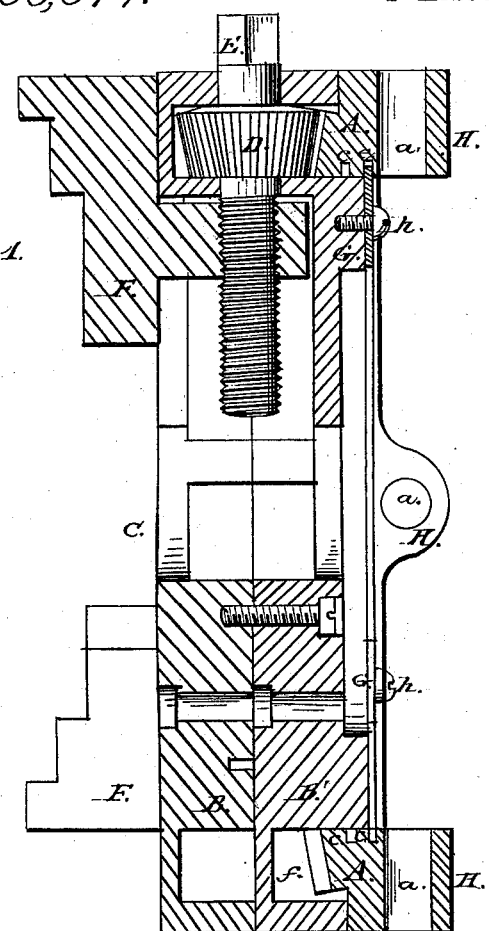
Figure 1 is a transverse section.
Figure 2:
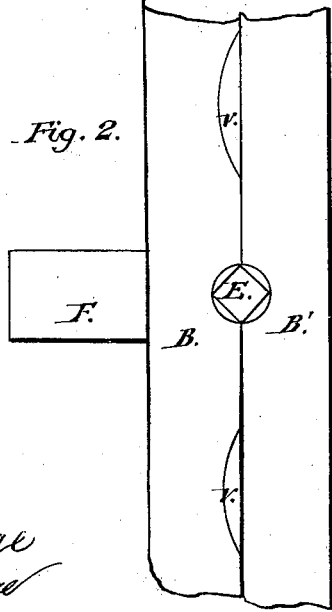
Figure 2 is a view of the edge, showing openings to let out dirt or chips.

I also provide several openings $v$, in the periphery of the disk B, fig. 2, which extend into the inner chamber formed by them, so that dirt or chips will pass out and not get into the gear. A screw may be applied to move the rack in and out of gear.

The object of this invention is to make a chuck in which the jaws can be used, combined or separately, it being often desirable to use the jaws independently, so that the article being turned, may be moved out of the centre when required, without changing the chuck.

This is accomplished by turning out the buttons G from the crease $e$, and moving out the rack A until they will enter the crease $c$, thereby moving it out of gear with the pinions on the shafts E, which operate the jaws. This allows any one of the jaws to be moved transversely by applying a wrench to the outer end of the pinion-shaft E.

Another and great advantage in this arrangement is the rapidity with which the jaws can be moved in and out. The rack being six to one of the pinion in diameter, one turn of it moves the jaws six times as fast as can be done by applying the wrench to the pinion-shaft E, as is the case with the common chuck of this class, and when the jaws are up against the metal to be clamped, the wrench can be applied to the pinion-shaft E, and power is obtained, if required, to tighten the jaws.

I am aware that chucks have heretofore been made in which the rack could be thrown into or out of gear with the pinions of the jaw-screws, and thus permit the operator to move either jaw separately, or all jointly, but I know of no chuck so made as to admit of those changes, and also of the movement of the jaws by the application of the wrench to the rack, or to either of the jaw-screws. Therefore I do not claim a chuck having its parts so constructed and arranged that the rack may not be used to drive all of the jaw-screws by the direct application of the wrench thereto, or either screw made to drive the rack and all the other screws by the application of the wrench to either of them, and the rack thrown into or out of gear at any time, without taking the chuck apart; but

What I claim as my invention, and desire to secure by Letters Patent, is—

The construction and relative arrangement of the rack A, grooves $c$, buttons G, or their equivalents, case B and B', screw-pinions D, and jaws F, operating substantially in the manner and for the purposes herein shown and described.

GEO. B. FAIRMAN.

Witnesses:
GEORGE A. GAGE,
I. L. GAGE.